United States Patent
Britton

(10) Patent No.: US 9,482,307 B2
(45) Date of Patent: Nov. 1, 2016

(54) MULTI-CYLINDER ENGINE CRANKSHAFT TORSIONAL VIBRATION ABSORBER AND BALANCER AND PROCESS THEREOF

(71) Applicant: Caterpillar Inc., Peoria, IL (US)

(72) Inventor: Jay D. Britton, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/554,395

(22) Filed: Nov. 26, 2014

(65) Prior Publication Data

US 2016/0146289 A1    May 26, 2016

(51) Int. Cl.
  *F16F 15/14*    (2006.01)
  *F16F 15/28*    (2006.01)
  *F16C 3/20*    (2006.01)

(52) U.S. Cl.
  CPC .............. *F16F 15/283* (2013.01); *F16C 3/20* (2013.01); *F16F 2226/04* (2013.01); *F16F 2230/0011* (2013.01); *F16F 2232/02* (2013.01)

(58) Field of Classification Search
  CPC ..... F16C 3/20; F16F 15/283; F16F 2232/02; F16F 2226/04; F16F 2230/0011; F16F 15/286; F16F 15/28; Y10T 74/2183; Y10T 74/2184
  See application file for complete search history.

(56) References Cited

U.S. PATENT DOCUMENTS

| | | | | |
|---|---|---|---|---|
| 2,239,111 A | * | 4/1941 | Moore | F16F 15/283 267/162 |
| 2,287,866 A | * | 6/1942 | Carmer | F16F 15/283 74/571.11 |
| 2,540,880 A | * | 2/1951 | Hey | F16F 15/14 74/604 |
| 4,739,679 A | | 4/1988 | Berger et al. | |
| 4,779,316 A | | 10/1988 | Cherry et al. | |
| 5,495,924 A | * | 3/1996 | Shaw | F16F 15/145 188/378 |
| 6,026,776 A | | 2/2000 | Winberg | |
| 6,688,272 B2 | | 2/2004 | Brevick et al. | |
| 8,807,108 B2 | | 8/2014 | Williams | |
| 8,813,604 B2 | * | 8/2014 | Geist | F16F 15/145 123/192.2 |
| 8,813,605 B2 | * | 8/2014 | Wakeman | F16C 3/20 123/192.2 |
| 2003/0183187 A1 | * | 10/2003 | Menzel | F02B 63/02 123/192.2 |
| 2009/0000589 A1 | * | 1/2009 | Weinzierl | F02B 75/06 123/192.2 |
| 2014/0102398 A1 | | 4/2014 | Orlamunder et al. | |
| 2014/0194213 A1 | | 7/2014 | Verhoog et al. | |

FOREIGN PATENT DOCUMENTS

| | | |
|---|---|---|
| CN | 102537020 B | 6/2014 |
| WO | 2004/067995 A1 | 12/2004 |
| WO | 2009/107688 A1 | 9/2009 |
| WO | 2014/118245 A1 | 8/2014 |

* cited by examiner

Primary Examiner — Adam D Rogers
(74) Attorney, Agent, or Firm — Baker & Hostetler LLP

(57) ABSTRACT

A crankshaft may comprise a plurality of main journals axially-aligned along a longitudinal axis, a plurality of crankpin journals radially-offset from the longitudinal axis, a first web, of a plurality of webs, coupled to a first main journal of the plurality of main journals and a first crankpin journal of the plurality of crankpin journals, wherein the first crankpin journal is coupled adjacent a first end of the first web, and a first counterweight coupled adjacent a second end of the first web, wherein a configuration of the first counterweight relative to the second end of the first web and the plurality of crankpin journals is spatially tuned and harmonically tuned to at least one harmonic mode of the crankshaft.

17 Claims, 13 Drawing Sheets

9,482,307 B2

MULTI-CYLINDER ENGINE CRANKSHAFT TORSIONAL VIBRATION ABSORBER AND BALANCER AND PROCESS THEREOF

TECHNICAL FIELD

This disclosure relates generally to crankshafts for reciprocating engines and more specifically to a vibration absorber and balancer for a crankshaft.

BACKGROUND

Reciprocating engines are often relied upon to provide increased power density, reduced fuel consumption and emissions, and increased reliability and uptime. Multi-cylinder engine arrangements are required to increase modularity and power levels, leading to twenty or more cylinders in a "V" formation. Such a configuration leads to particularly long crankshafts that are more flexible in torsion. All of the above trends are creating severe crankshaft torsional vibration challenges.

As an example, U.S. Pat. No. 8,807,108 describes a pendular dampener arranged to counterweight journal pins formed along a crankshaft and configured to couple with connecting rods. The configuration of the pendular dampeners may attenuate vibrations in the crankshaft caused by the associated journal pins. The pendular dampeners may also increase the stiffness of the crankshaft reducing bending in the crankshaft, thereby increasing the efficiency of the crankshaft during rotation and reducing vibration. The pendular dampeners also provide additional unloading of main bearing inertia forces. However, the pendular dampeners of U.S. Pat. No. 8,807,108 do not address torsion forces in the crankshaft due to resonance of the crankshaft. The disclosure addresses these and other shortcomings of the prior art.

SUMMARY

In certain aspects, the disclosure is directed to a vibration absorbing and balancing strategy in conjunction with a crankshaft. In one aspect, the disclosure describes a crankshaft including a plurality of main journals axially-aligned along a longitudinal axis, a plurality of crankpin journals radially-offset from the longitudinal axis, a first web, of a plurality of webs, coupled to a first main journal of the plurality of main journals and a first crankpin journal of the plurality of crankpin journals, wherein the first crankpin journal is coupled adjacent a first end of the first web, a first counterweight coupled adjacent a second end of the first web, wherein a configuration of the first counterweight relative to the second end of the first web and the plurality of crankpin journals is spatially tuned and harmonically tuned to at least one harmonic mode of the crankshaft.

In another aspect, a method for balancing a crankshaft may include determining at least one harmonic mode of the crankshaft, selecting a web of a plurality of webs based upon the determined at least one harmonic mode, wherein the selected web is coupled to at least one main journal of the plurality of main journals and at least one crankpin journal of the plurality of crankpin journals, and coupling a counterweight to the select web.

In yet another aspect, a counterweight may include a main body having a generally semi-annular disc shape, a slot formed in a portion of the main body, the slot configured to receive at least a portion of a member to be coupled to the main body, wherein the slot is interposed between a first coupling wall and a second coupling wall formed in the main body, a first pair of apertures formed in the first coupling wall, a second pair of apertures formed in the second coupling wall, the second pair of apertures aligned with the first pair of apertures, and a coupling mechanism configured to extend through at least one aperture of the first pair of apertures and at least one aperture of the second pair of apertures to secure the member in the slot of the main body.

DETAILED DESCRIPTION

Figure 1:
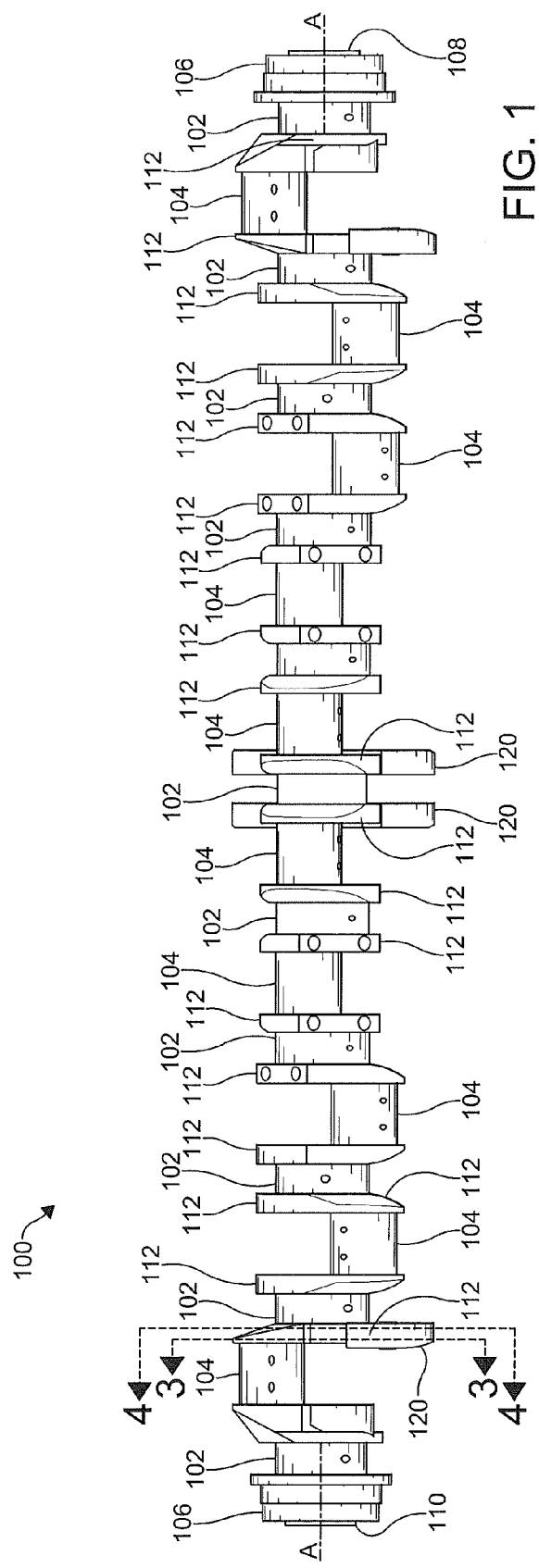
FIG. 1 is a front elevation view of a crankshaft in accordance with aspects of the disclosure.
Figure 2:
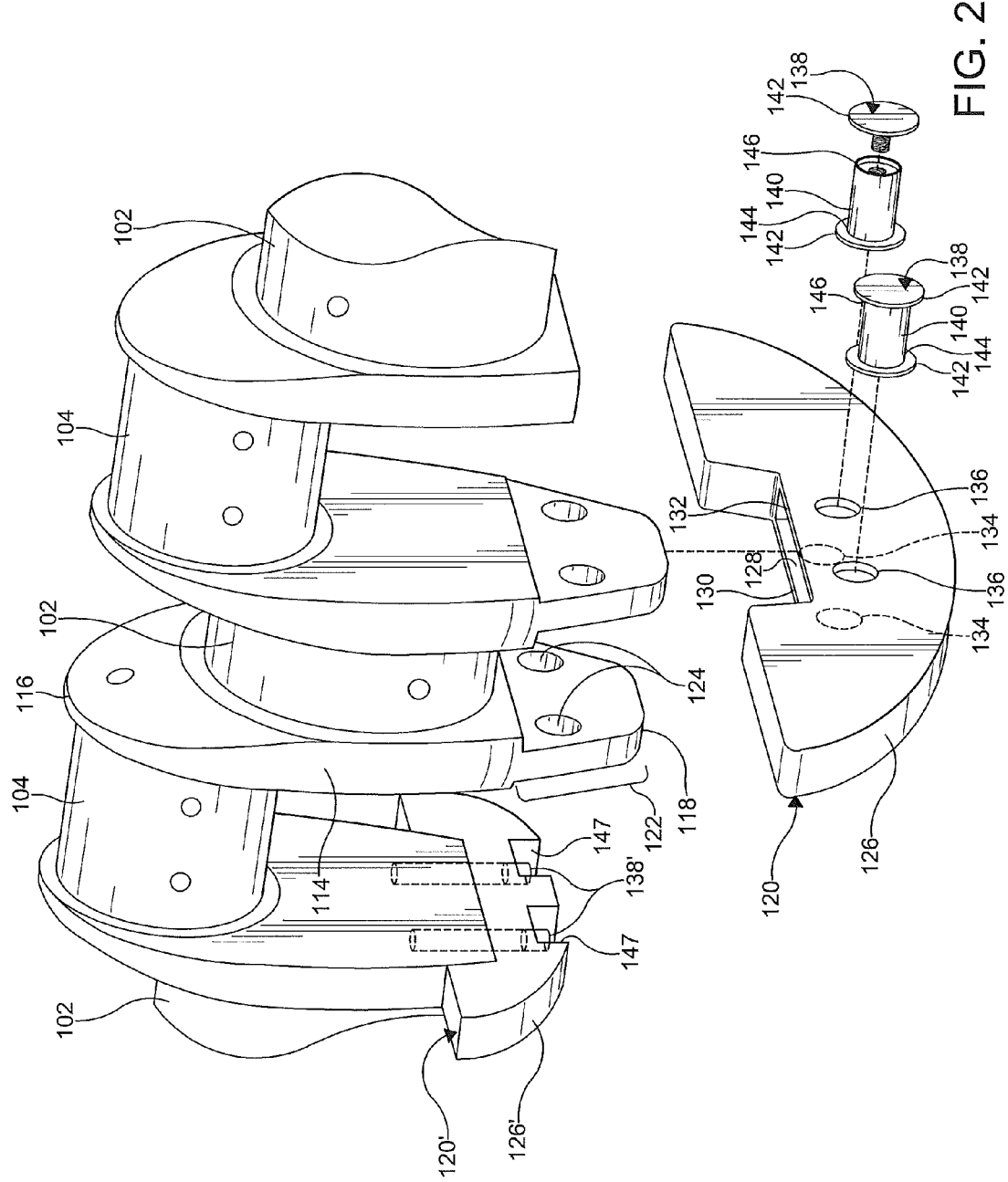
FIG. 2 is a partially exploded perspective view of a portion of the crankshaft of FIG. 1.
Figure 3:
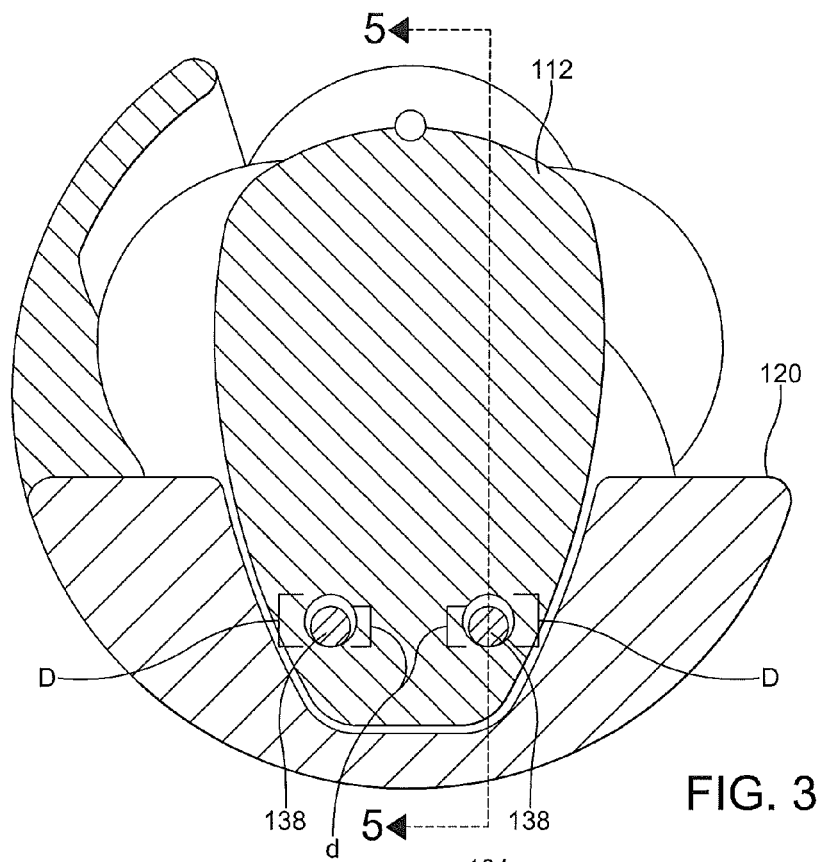
FIG. 3 is a sectional view of the crankshaft of FIG. 1 taken across line 3-3 in FIG. 1.
Figure 4:
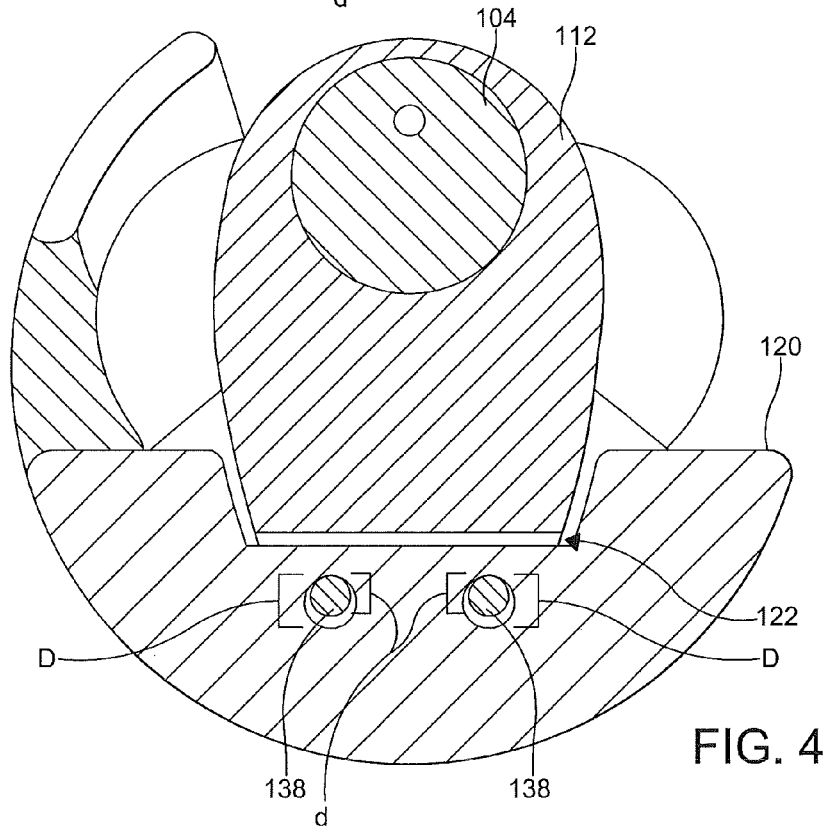
FIG. 4 is a sectional view of the crankshaft of FIG. 1 taken across line 4-1 in FIG. 1.
Figure 5:
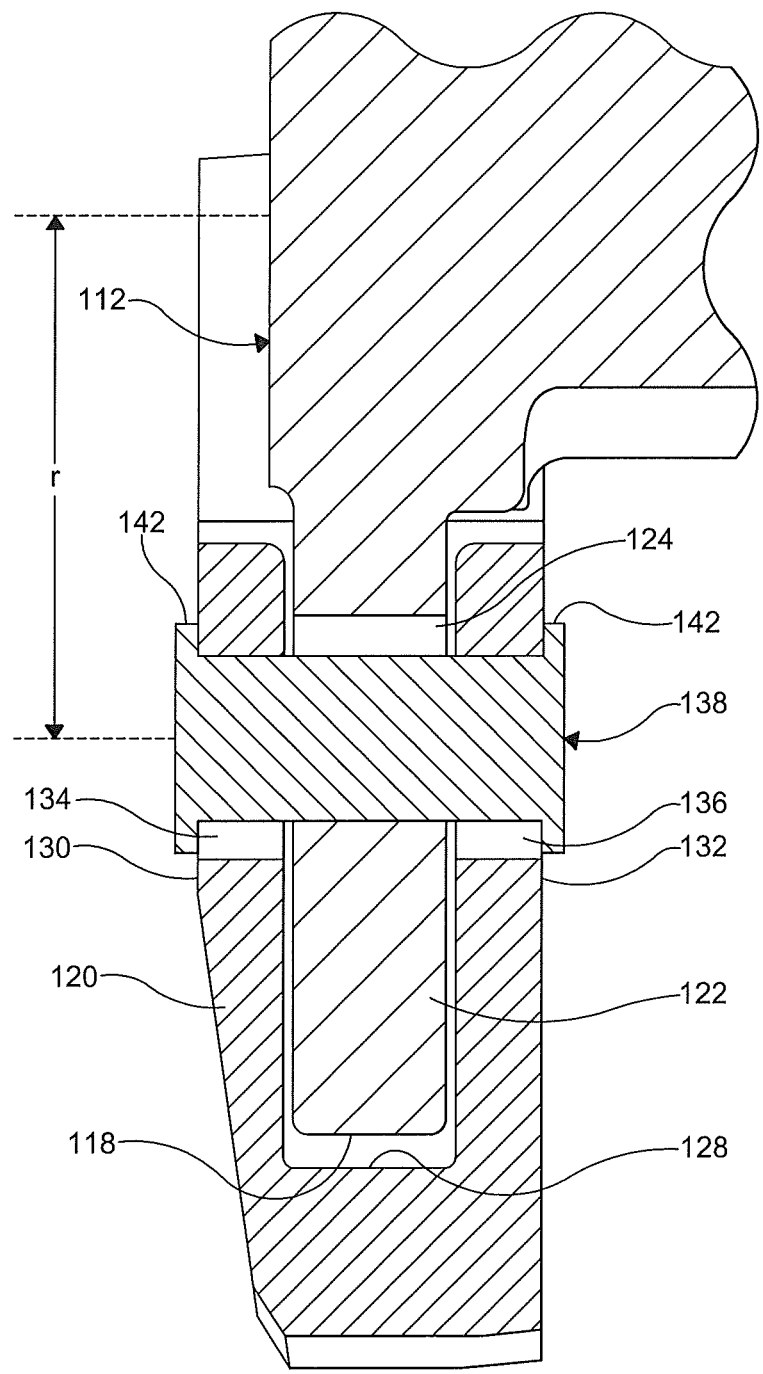
FIG. 5 is a sectional view of the crankshaft of FIG. 4 taken across line 5-5 in FIG. 4.

In an aspect, vibrations such as torsional vibrations of a multi-cylinder engine crankshaft may be managed by removing vibrational energy from the excitation and response of the crankshaft, without interfering with the engine operation. As an example, a configuration of a torsional vibration absorber may be tuned in "space" by removing energy from a particular mode shape (for example the second crank harmonic mode) and/or in "frequency" by removing energy from a particular engine excitation order (for example the fifth order that is particularly troublesome in a V-20 engine). Such tuning in space and frequency offers unique advantages in allowing large reciprocating engines with long crankshafts to operate safely and reliably at higher speeds, while delivering increased power density and meeting emissions requirements. As a further example, such tuning may be accomplished by selectively configuring bifilar pendulum absorbers by tuning a pendulum motion of the absorbers to a particular engine excitation order n and selectively positioning the absorbers along the crankshaft based at least on a shape of the crankshaft harmonic mode.

Now referring to the drawings and more particularly to FIGS. 1-5, a crankshaft 100 may include a plurality of main journals 102 axially-aligned along a longitudinal axis A-A and a plurality of crankpin journals 104 radially-offset from the longitudinal axis A-A. In an aspect, the crankshaft 100 may include one or more bearings 106 coupled to a first end 108 or second end 110 of the crankshaft 100 and axially aligned along the longitudinal axis A-A. Other components such as flywheels, dampers (e.g., Geislinger damper, viscous damper, etc.) may be coupled to the crankshaft 100. As an example, the crankshaft 100 may be a component of a multi-cylinder engine (e.g., reciprocating engine). As another example, the crankshaft 100, may be configured to couple to a plurality of connecting rods (not shown). In an aspect, each of the crankpin journals 104 may be configured to couple to one or more piston rods or connecting rods. It is understood that various coupling mechanisms may be used to couple the connecting rods to the crankpin journals. It is further understood that various rod configurations, such as fork and blade configurations, may be used. In certain aspects, the crankshaft 100 may be configured to couple to twenty connecting rods. Other configurations and number of connecting rods may be used.

The crankshaft 100 may also include a plurality of webs 112 or linkages. In an aspect, one or more of the webs 112 may be coupled between at least one of the main journals 102 and one of the crankpin journals 104. As more clearly shown in FIG. 2, one or more of the webs 112 may include a central portion 114 disposed between a first end 116 and a second end 118. As an example, one of the main journals 102 may be coupled to the central portion 114. As another example, one of the crankpin journals 104 may be coupled adjacent the first end 116. As a further example, the second end 118 of one or more of the webs 112 may be configured to be coupled to a counterweight 120. Any number of counterweights 120 may be coupled to any number of the webs 112. In certain aspects, each of the webs 112 may be coupled to at least one of the main journals 102, at least one of the crankpin journals 104, and at least one counterweight 120. However, other configurations may be used.

In an aspect, one or more of the webs 112 may include an indented portion 122. As an example, the indented portion 122 may be formed adjacent the second end 118 of the web 112. As another example, the indented portion 122 may have a thickness that is less than a thickness of the central portion 114 of the respective web 112. As a further example, one or more apertures 124 may be formed adjacent the second end 118 of one or more webs 112. The apertures 124 may be configured to receive a coupling mechanism such as a pin (e.g., coupling mechanism 138). Such a coupling mechanism may be used to releaseably couple the counterweight 120 to the respective web 112. Other coupling mechanisms may be used.

In an aspect, the counterweight 120 may include a main body 126 having a generally semi-annular disc shape. Other shapes, sizes, and masses may be used. A slot 128 may be formed in a portion of the main body 126. The slot 128 may be configured to receive at least a portion of a member such as the web 112 (e.g., indented portion 122) to be coupled to the main body 126. As an example, the slot 128 may be interposed between a first coupling wall 130 and a second coupling wall 132 formed in the main body 126. As such, interior surfaces of the coupling walls 130, 132 define at least a portion of the slot 128. A first plurality of apertures 134 (e.g., pair) may be formed in the first coupling wall 130. A second plurality of apertures 136 (e.g., pair) may be formed in the second coupling wall 132. It is understood that any number apertures 134, 136, including one, may be used. As an example, a first pair of the apertures 134 may be substantially aligned with a second pair of the apertures 136 to receive the coupling mechanism 138.

In an aspect, the a coupling mechanism 138 may be configured to extend through at least one aperture of the first plurality of apertures 134 and at least one aperture of the second plurality of apertures 136 to secure a member in the slot 128 of the main body 126. As an example, the apertures 124 of one of the webs 112 may be aligned with respective ones of the apertures 134, 136 to receive the coupling mechanism 138 and to slideably couple the counterweight 120 to the one of the webs 112. As another example, the coupling mechanism may be or may include a roller-type pin having a cylindrical main body 140 and a flange 142 disposed adjacent each of a first end 144 and a second end 146 of the main body 140. At least one of the flanges 142 may be coupled to an insert threadably extending into the main body 140 similar to roller-type pins or roller screws. As such, at least one of the flanges 142 may be selectively removed from the main body 140 for installation of the main body 140 through the apertures 124, 134, 136. The coupling mechanism 138 may be formed from various materials including steel and alloys.

In another aspect, a counterweight 120' may be similar to counterweight 120, except as described herein. As an example, the counterweight 120' may include a main body 126' having a generally semi-annular disc shape. Other shapes, sizes, and masses may be used. The main body 126' may be configured to abut a member such as a portion of one of the webs 112 (e.g., second end 118). As an example, one or more coupling mechanisms 138' (e.g., bolt, threaded fastener, etc.) may be configured to extend through at least a portion of the main body 126' to secure the counterweight 120' to the web 112. As an example, bores 147 may be defined in one or more of the main body 126' and a portion of the web 112 to receive the coupling mechanism 138'. As a further example, the coupling mechanism 138' may be configured to secure the counterweight 120' to one or more of the webs 112 or other members as a fixed counterweight, as opposed to a pendulum counterweight. Any number of counterweights 120' may be selectively coupled to various members of a device such as the crankshaft 100.

In another aspect, the counterweight 120 may be configured as a bifilar pendulum. As more clearly shown in FIGS. 3-5, the counterweight 120 may be coupled adjacent the second end 118 of one of the webs 112 by extending a pair of pins (e.g., coupling mechanisms 138) through one of the apertures 124 of one of the webs 112 and through the substantially aligned apertures 134, 136. As an example, the configuration of the apertures 124, 134, 136 may result in a clearance gap between the coupled counterweight 120 and the second end 118 of the web 112. As another example, each of the apertures 124, 134, 136 may have a substantially uniform diameter D. As a further example, the main body 140 of the coupling mechanisms 138 may have a diameter d that is less than the diameter D of the apertures 124, 134, 136 to at least allow the main body 140 to moveably extend through the apertures 124, 134, 136. As a further example, the flanges 142 of the coupling mechanisms 138 may have a diameter that is greater than the diameter D of the apertures 124, 134, 136 to provide a limit to the motion of the coupling mechanisms 138 through the apertures 124, 134, 136. In certain aspects, clearance gaps may be provided between one or more of the flanges 142, the coupling walls 130, 132, and the web 112. As an example, lubrication may be applied to various surfaces of potential contact to allow the counterweight 120 to slideably engage surfaces of the web 112 and/or the coupling mechanisms 138.

In an aspect, a configuration of one or more of the counterweights 120, 120' relative to the second end 118 of the coupled web 112 and the plurality of crankpin journals 104 may be spatially tuned and harmonically tuned to at least one harmonic mode of the crankshaft 100. To tune the configuration of the counterweights 120, 120' in space, a select subset of the webs 112 may be coupled to a bifilar configuration of the counterweight 120, while another select subset of the webs 112 may be coupled to a fixed counterweight 120'. As an example, a selection of which of the webs 112 is fixed with a particular counterweight configuration, may depend at least partially on a shape of a harmonic mode of the crankshaft 100. As a further example, by spacing bifilar configured counterweights 120 from a node of a particular harmonic mode (e.g., closer to a peak of displacement), the bifilar configured counterweights 120 may be more effective in dampening the displacement at the particular harmonic mode. The configuration of at least the counterweights 120 may be harmonically tuned (tuned in frequency) based upon a select engine excitation order n. For example, the following geometric relationship may be used: $r/L=n^2$, where r=radius of rotation of the attachment of the bifilar pendulum in the rotating field (shown in FIG. 8), L=D−d (the effective length of the bifilar pendulum produced by the coupling mechanism 138 having diameter d rolling in apertures 124, 134, 136 having diameter D), and n is the excitation order of a particular harmonic mode. As an example, to tune the configuration of the counterweights 120 in frequency to the fifth engine excitation order (n=5), the bifilar pendulum may be mounted at r=about 100 mm, the coupling mechanism 138 and the apertures 124, 134, 136 may be dimensioned such that D−d=about 4 mm. As another example, to tune the configuration of the counterweights 120 in frequency to the fifth engine excitation order (n=5) and if the bifilar pendulum may be mounted at r=about 145.5 mm, the coupling mechanism 138 and the apertures 124, 134, 136 may be dimensioned such that D−d=30.82 mm−25 mm=5.82 mm. With the difference of D−d calculated (tuned) to a particular order of excitation, the coupling mechanisms 138 may allow the counterweight 120 to swing as a bifilar pendulum to attenuate forces at the tuned order of excitations. As a further example, the diameter d of the coupling mechanisms 138 may be set at a required value to handle the loads at the engine operating speed. Other configurations and tuning may be implemented.

INDUSTRIAL APPLICABILITY

Operation will be discussed in reference to the crankshaft 100 illustrated in FIGS. 1-5. In an aspect, a large multi-cylinder engine may include twenty or more cylinders. Typically, as the number of cylinders increases, so must the length of the associated crankshaft. As the length of a crankshaft increases, the flexure in the crankshaft may increase and may be susceptible to torsion forces. It has been found that under certain operational parameters (e.g., angular velocities) forces such as torsion forces cause harmonic vibrations in the crankshaft. Such harmonic vibrations resonate in magnitude to cause increased displacement in portions of the crankshaft. When displacement of the crankshaft reaches a certain limit, the engine operation may suffer and/or the crankshaft may fail.

Figure 6:
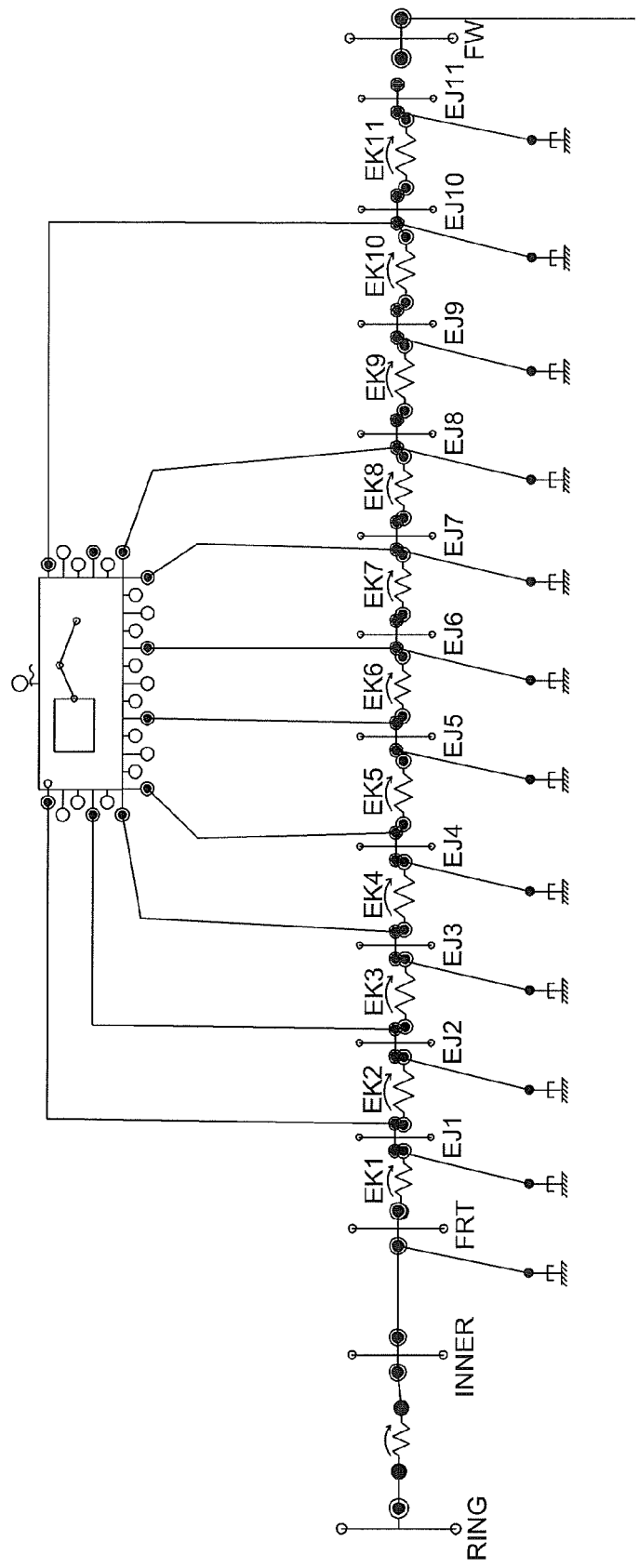
FIG. 6 is a schematic of an exemplary crankshaft testing model in accordance with aspects of the disclosure.

FIG. 6 illustrates a schematic of a computer model for modelling operation of a crankshaft, such as crankshaft 100. As shown, portions of the crankshaft 100 have been modeled and are labeled as front FRT, rear REAR, and EJ1-EJ10 representing a model of the crankpin journals 104. At the front FRT of the crankshaft 100, a Geislinger damper has been modeled. As the rear REAR of the crankshaft 100, a flywheel has been modeled. Distributed along the crankshaft 100 are a plurality of sensors EK1-EK11 configured to model forces on and displacement of a particular portion of the crankshaft 100 during modeled operation.

Figure 7:
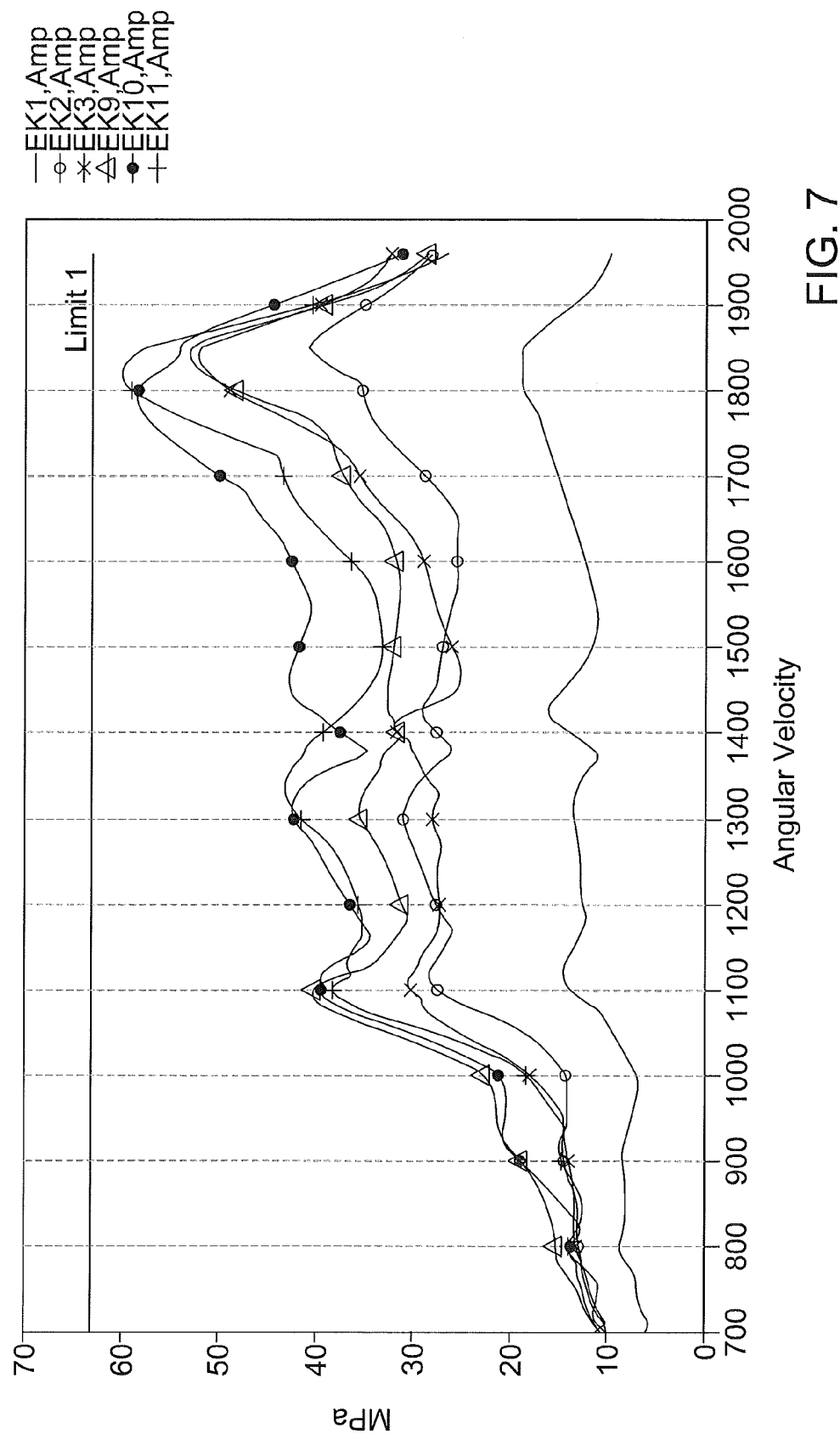
FIG. 7 is a graphical plot of force vs. angular velocity based on the crankshaft testing model of FIG. 6.
Figure 8:
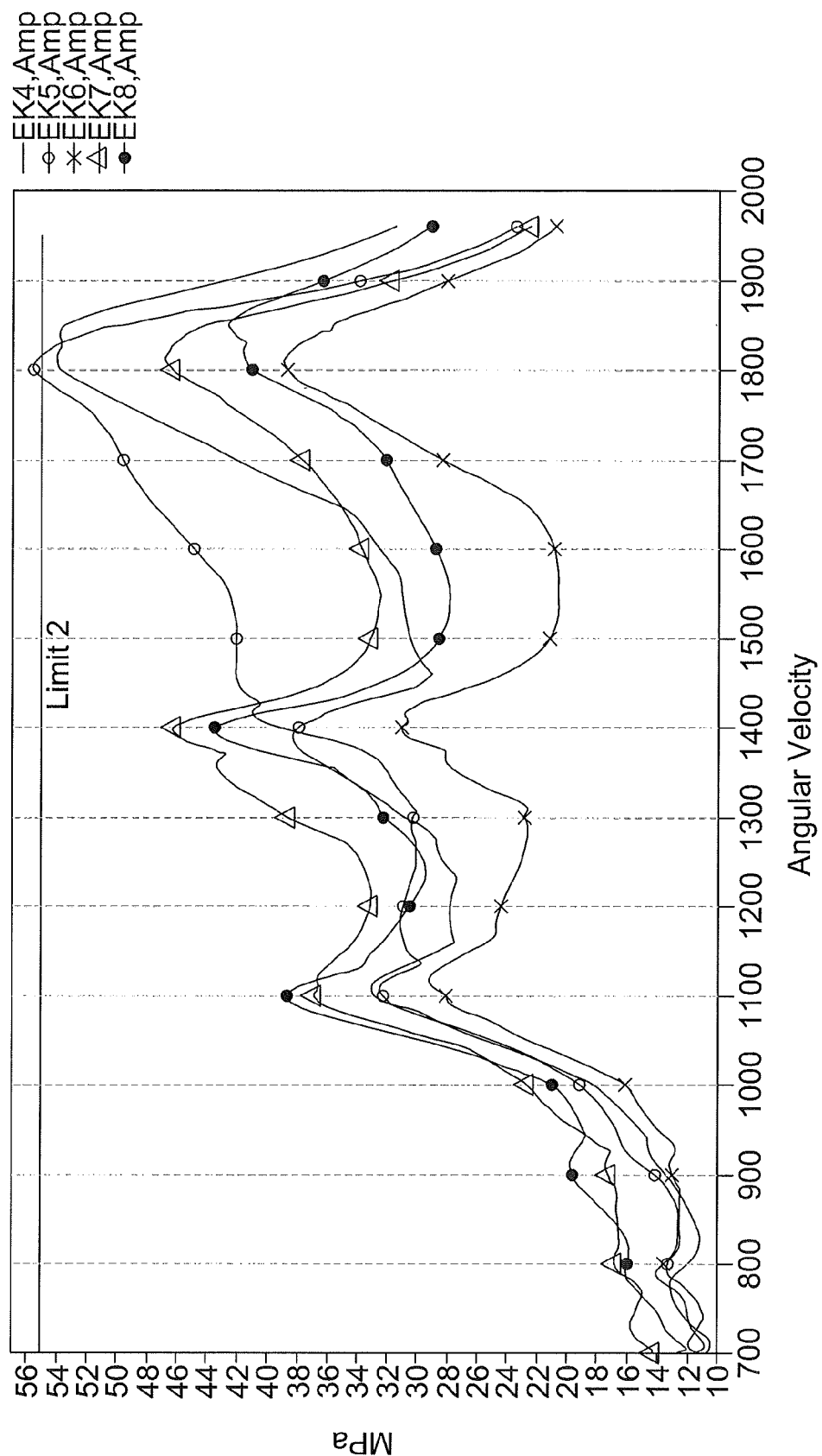
FIG. 8 is a graphical plot of force vs. angular velocity based on the crankshaft testing model of FIG. 6.

FIG. 7 illustrates a graphical plot of force vs. angular velocity based on the crankshaft testing model of FIG. 6. FIG. 7 focuses on the outside portions of the crankshaft 100 as represented by sensors EK1, EK2, EK3 and EK9, EK10, EK11. As illustrated, when angular velocity increases, the forces on the various portions of the crankshaft 100 increases. Furthermore, as the angular velocity increases, vibrations along the crankshaft 100 enter various harmonic modes, as evidenced by spikes in force. Since the model of FIG. 6 included a Geislinger damper, the forces modeled at sensors EK1, EK2, EK3 have been attenuated. However, the Geislinger damper is less effective at attenuating forces on the inner portions of the crankshaft 100. For example, FIG. 8 illustrates a graphical plot of force vs. angular velocity based on the crankshaft testing model of FIG. 6 for sensors EK4-EK8. As illustrated, when angular velocity increases, the forces on the various portions of the crankshaft 100 increases. Furthermore, as the angular velocity increases, vibrations along the crankshaft 100 enter various harmonic modes, as evidenced by spikes in force. In particular, the fifth harmonic mode appears to occur at about 1800 rad/sec and results in a spike in forces for at least the sensor EK5 that exceeds the failure limit of 55 MPa. Such a result may be read as a failure in the crankshaft 100 in normal, real-world applications.

Figure 10:
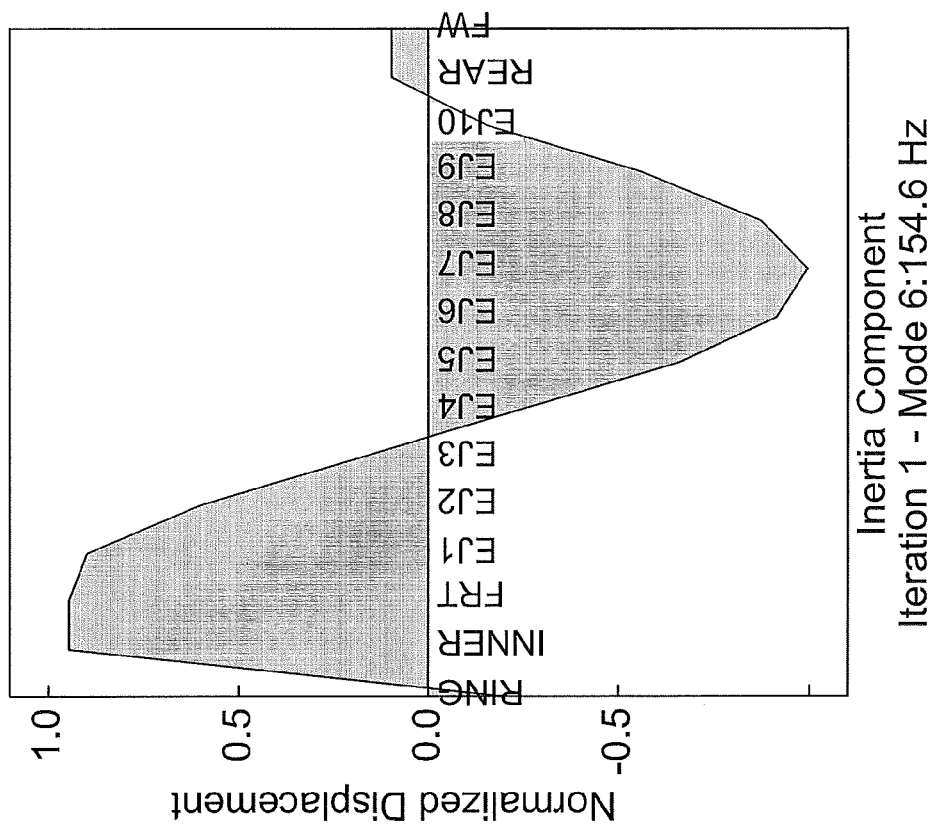
FIG. 10 is a graphical plot of normalized displacement of a crankshaft at a second frequency.
Figure 9:
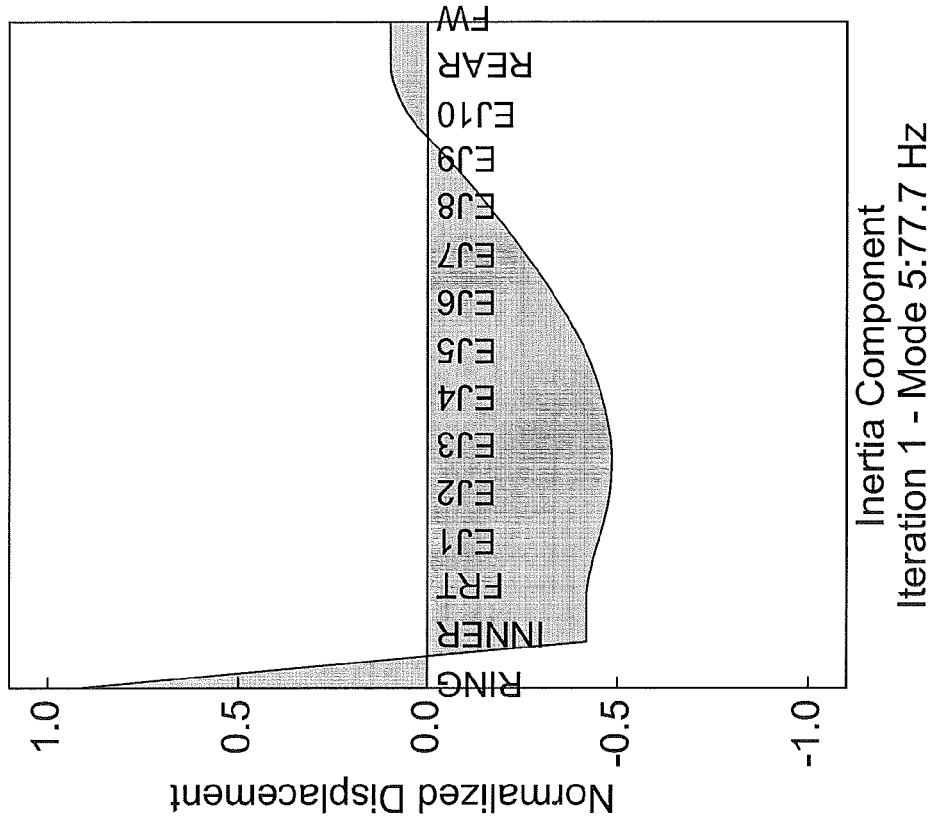
FIG. 9 is a graphical plot of normalized displacement of a crankshaft at a first frequency.

In order to address such stresses, the methods and systems of the disclosure may be used. In an aspect, a method of tuning and balancing a crankshaft such as crankshaft 100 may include determining at least one harmonic mode of the crankshaft 100. As an example, a model of the crankshaft 100 such as shown in FIG. 6 may be used to determine the at least one harmonic mode of the crankshaft 100. As more clearly shown in FIGS. 9 and 10, the model of FIG. 6 may be tested at various mode frequencies (e.g., about 77.7 Hz in FIG. 9 and 154.6 Hz in FIG. 10) and the displacement at various portions (e.g., EJ1-EJ10, FRT, REAR, etc.) along the crankshaft 100, may be modeled. As shown in FIG. 9, one harmonic mode of the modeled crankshaft 100 may have a shape with a node between EJ9 and EJ10. As shown in FIG. 10, another harmonic mode of the crankshaft 100 may have a shape with a node between EJ3 and EJ4 and another node between EJ10 and the REAR of the crankshaft 100. Based at least in part on the shape of the harmonic modes, one or more webs may be selected to be coupled to one or more of the counterweights 120, 120'. As an example, to tune the configuration of the counterweights 120, 120' in space, a select subset of the webs 112 may be coupled to a bifilar configuration of the counterweight 120, while another select subset of the webs 112 may be coupled to a fixed counterweight 120'. As an example, a selection of which of the webs 112 is fixed with a particular counterweight configuration may depend at least partially on a displacement region of a harmonic mode of the crankshaft 100, wherein a portion of the crankshaft 100 is being displaced. As a further example, by spacing bifilar configured counterweights 120 from a node of a particular harmonic mode (e.g., closer to a peak of a displacement region), the bifilar configured counterweights 120 may be more effective in dampening the displacement at the particular harmonic mode.

In certain aspects, the configuration (e.g., pendulum dynamics) of the counterweights 120 can be tuned in frequency (e.g., harmonically tuned). For example, the following geometric relationship may be used: $r/L=n^2$, where r=radius of rotation of the attachment of the bifilar pendulum in the rotating field (shown in FIG. 8), L=D−d (the effective length of the bifilar pendulum produced by the coupling mechanism 138 having diameter d rolling in apertures 124, 134, 136 having diameter D), and n is the excitation order of a particular harmonic mode. For the fifth engine excitation order (n=5), the bifilar pendulum may be mounted at r=about 100 millimeters (mm), the coupling mechanism 138 and the apertures 124, 134, 136 may be dimensioned such that D−d=about 4 mm. As another example, to tune the configuration of the counterweights 120 in frequency to the fifth engine excitation order (n=5) and if the bifilar pendulum may be mounted at r=about 145.5 mm, the coupling mechanism 138 and the apertures 124, 134, 136 may be dimensioned such that D−d=30.82 mm−25 mm=5.82 mm. With the difference of D−d calculated (tuned) to a particular order of excitation, the coupling mechanisms 138 may allow the counterweight 120 to swing as a bifilar pendulum to attenuate forces at the tuned order of excitations (e.g., harmonic mode). As a further example, the difference of D−d is between about 4 mm and about 7 mm including intervening endpoints such as between about 5 mm and about 6 mm.

Figure 11:
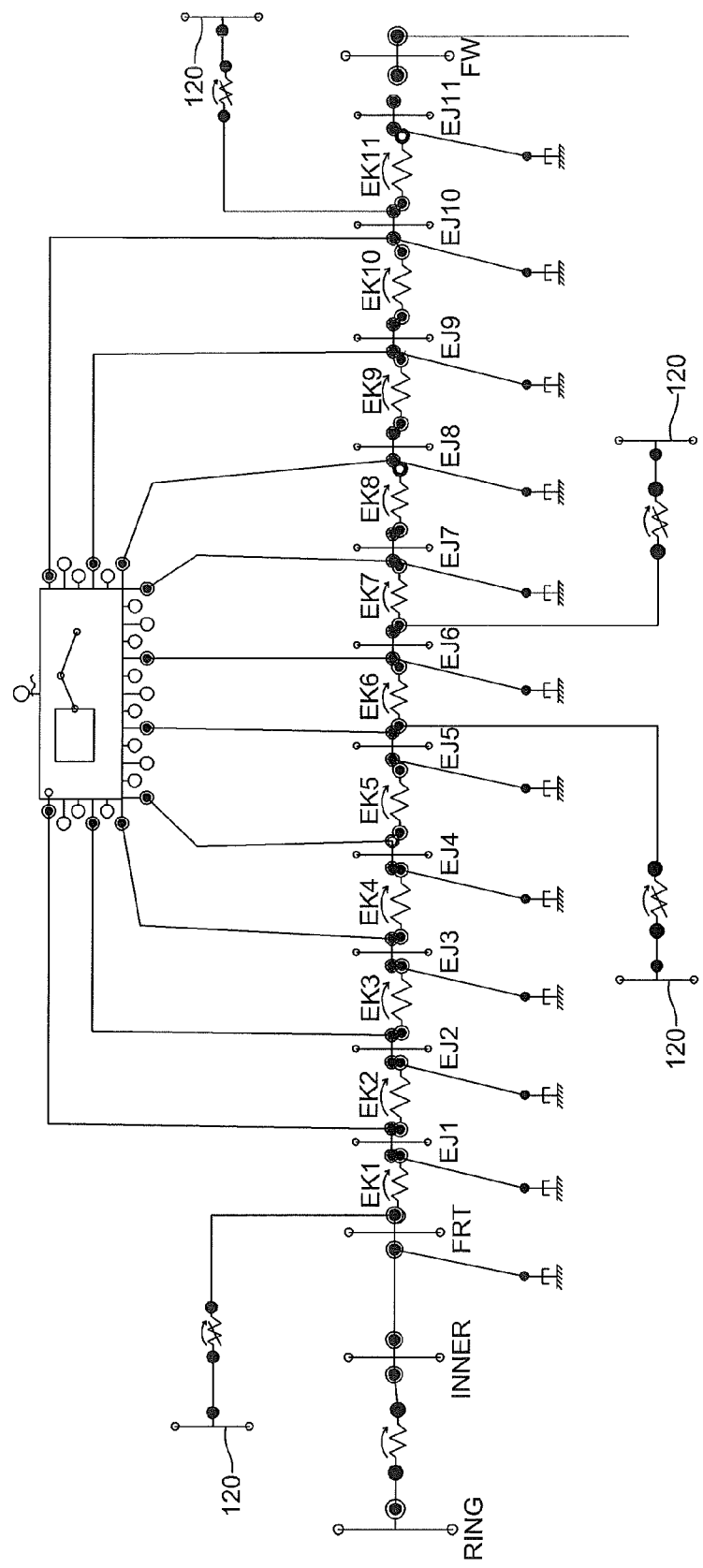
FIG. 11 is a schematic of an exemplary crankshaft testing model in accordance with aspects of the disclosure.

FIG. 11 illustrates a schematic of a computer model for modelling operation of a crankshaft, such as crankshaft 100. As shown, portions of the crankshaft 100 have been modeled and are labeled as front FRT, rear REAR, and EJ1-EJ10 representing a model of the crankpin journals 104. At the front FRT of the crankshaft 100, a Geislinger damper has been modeled. As the rear REAR of the crankshaft 100, a flywheel has been modeled. Distributed along the crankshaft 100 are a plurality of sensors EK1-EK11 configured to model forces on and displacement of a particular portion of the crankshaft during modeled operation. In addition, the model includes four counterweights 120 selectively positioned in space and tuned in frequency. As an example, the counterweights 120 have be modeled in spatial relation for the second harmonic mode of the crankshaft 100 to be located within a displacement region (spaced from nodes and positioned in proximity to peaks of displacement). Such positioning has the counterweights 120 modeled adjacent each of the front FRT, EJ5, EJ6, and EJ10. Further, each of the counterweights 120 may be configured to be harmonically tuned for the fifth order excitation, as described herein above. Such spatial and harmonic tuning attenuates the forces applied to the crankshaft 100, as evidenced by FIGS. 12 and 13.

Figure 12:
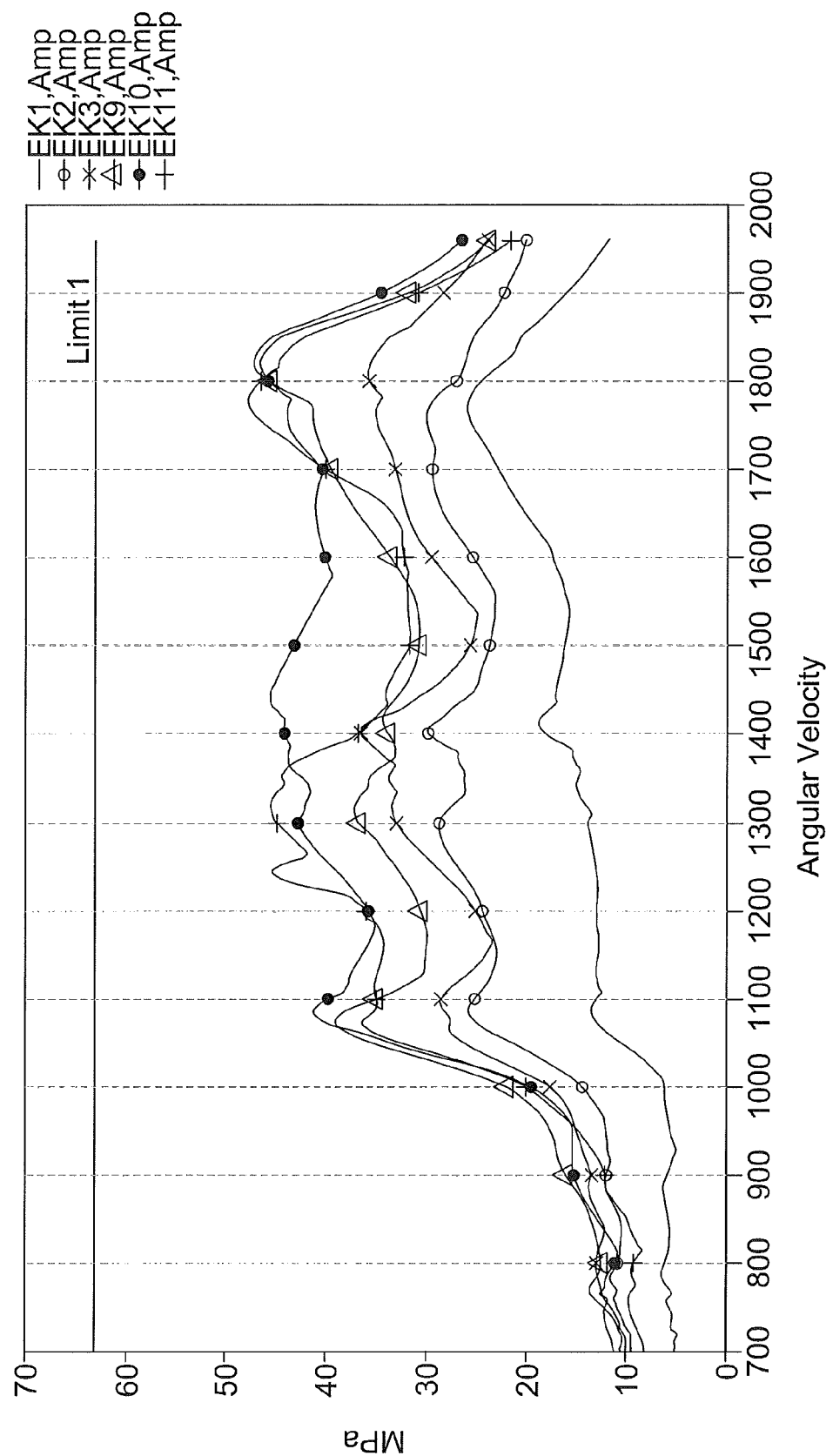
FIG. 12 is a graphical plot of force vs. angular velocity based on the crankshaft testing model of FIG. 11.
Figure 13:
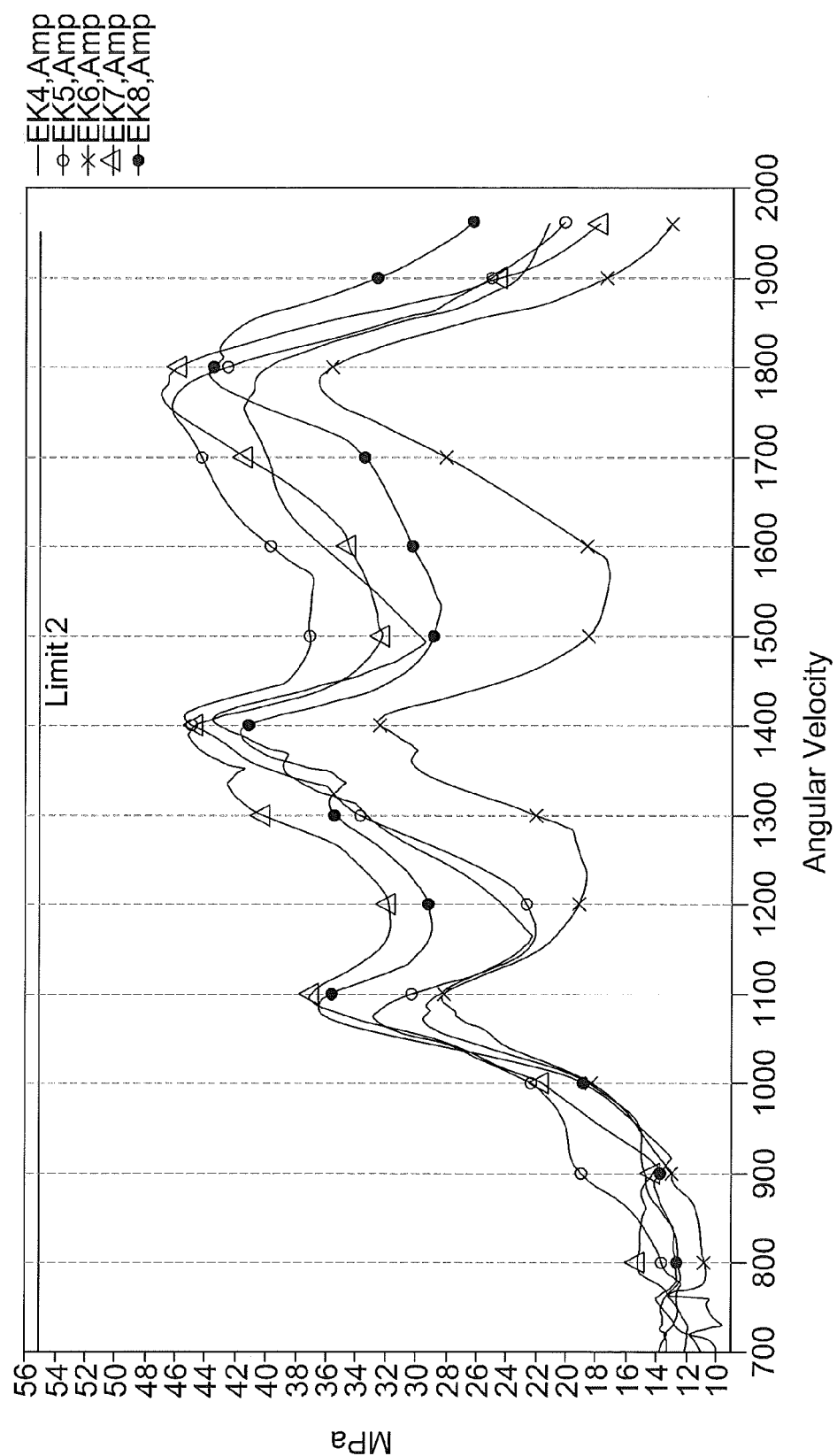
FIG. 13 is a graphical plot of force vs. angular velocity based on the crankshaft testing model of FIG. 11.

For example, FIGS. 12 and 13 illustrate graphical plots of force vs. angular velocity based on the crankshaft testing model of FIG. 11. FIG. 12 focuses on the outside portions of the crankshaft 100 as represented by sensors EK1, EK2, EK3 and EK9, EK10, EK11. FIG. 13 illustrates a graphical plot of force vs. angular velocity for sensors EK4-EK8. As illustrated, when angular velocity increases, the forces on the various portions of the crankshaft 100 increases. Furthermore, as the angular velocity increases, vibrations along the crankshaft 100 enter various harmonic modes, as evidenced by spikes in force. Since the model of FIG. 11 has been spatially and harmonically tuned, the forces modeled at the second harmonic mode (spatially) and the fifth harmonic mode (harmonically at about 1800 rad/sec) have been attenuated.

Figure 14:
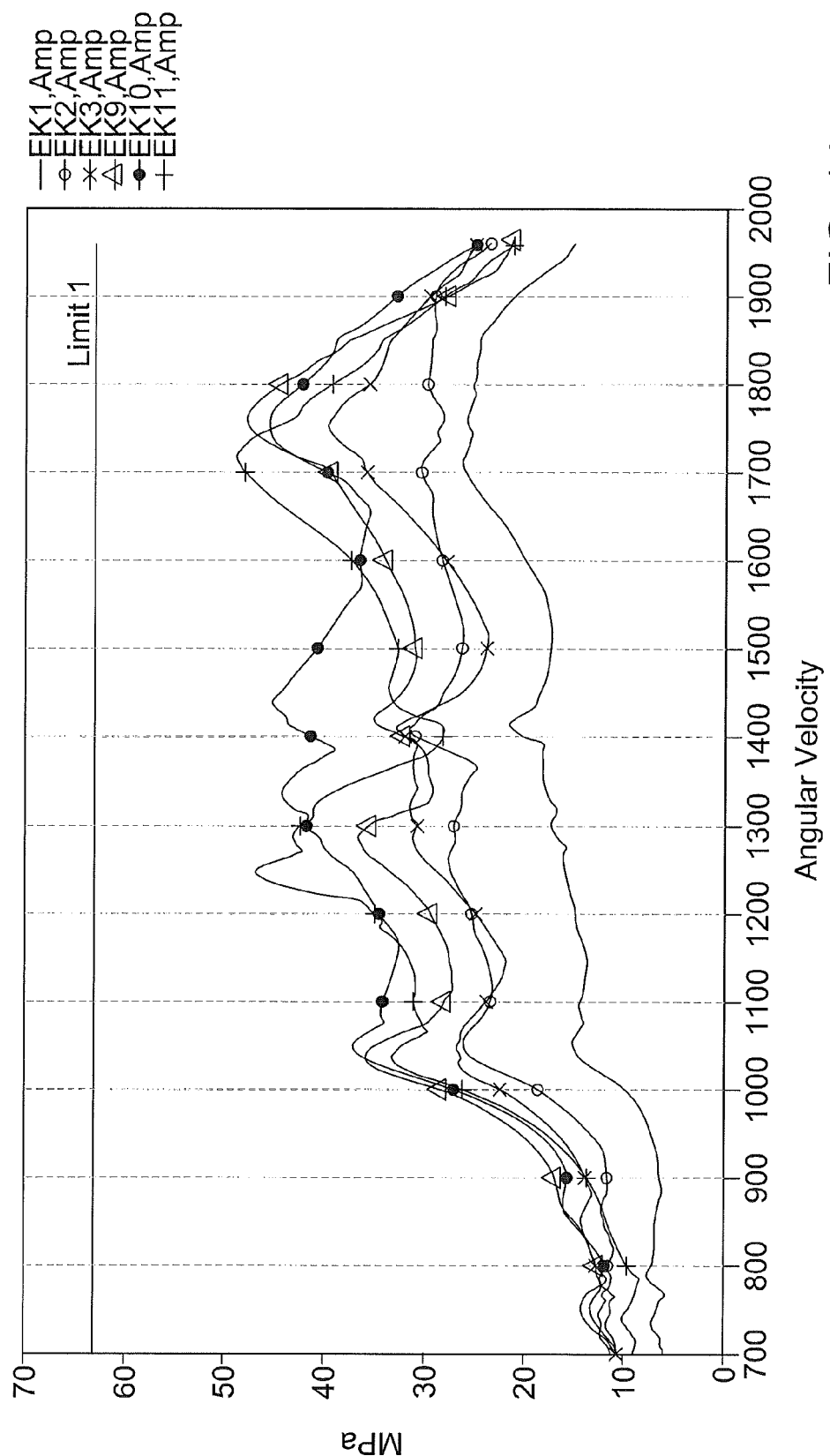
FIG. 14 is a graphical plot of force vs. angular velocity based on the crankshaft testing model of FIG. 11.
Figure 15:
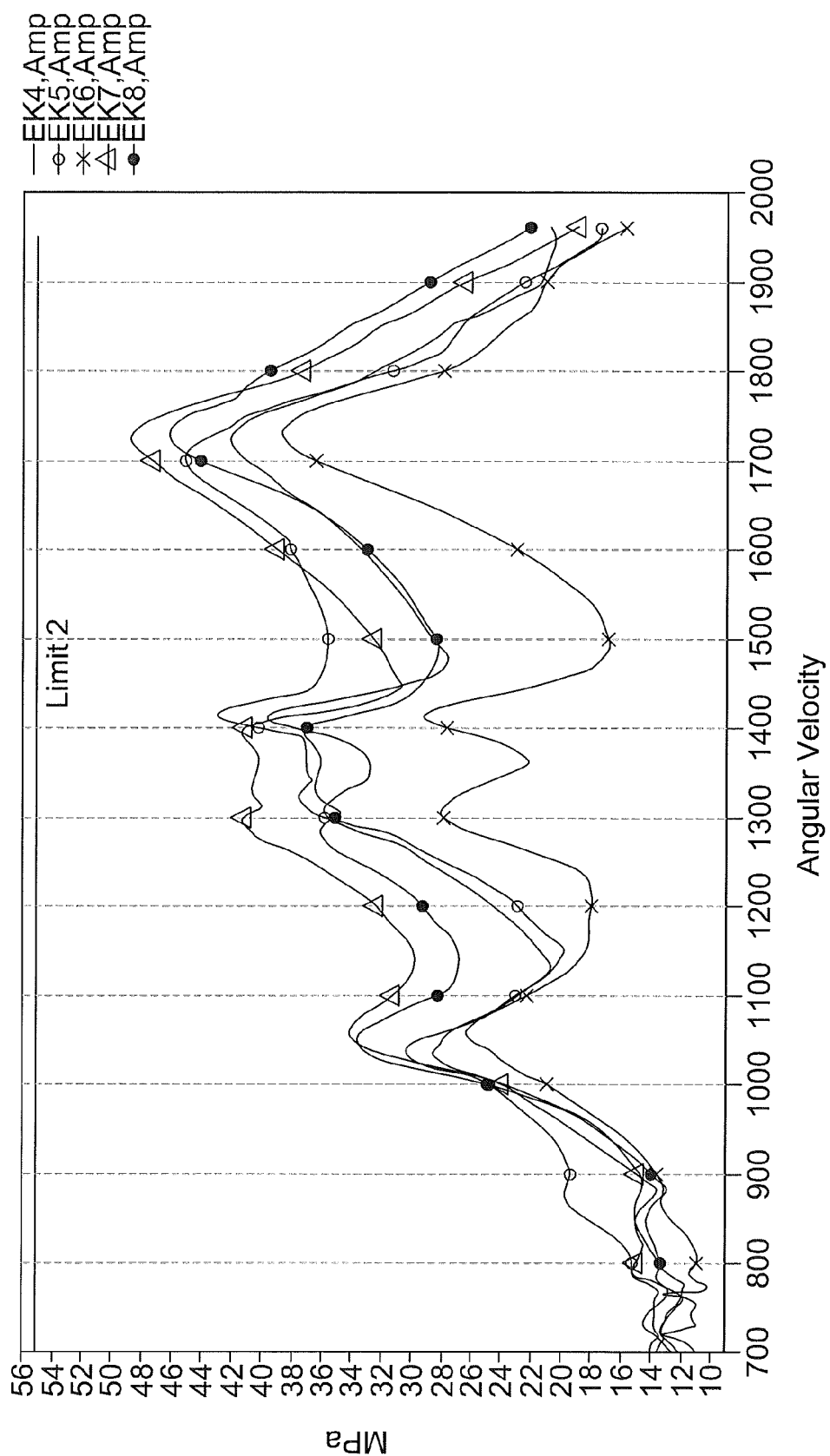
FIG. 15 is a graphical plot of force vs. angular velocity based on the crankshaft testing model of FIG. 11.

As a further example, the model of FIG. 11 may be adjusted to replace the Geislinger damper with a lower cost viscous damper (not shown). As such, FIGS. 14 and 15 illustrate graphical plots of force vs. angular velocity based on the crankshaft testing model of FIG. 11 with a viscous damper modeled in the place of the Geislinger damper. FIG. 14 focuses on the outside portions of the crankshaft 100 as represented by sensors EK1, EK2, EK3 and EK9, EK10, EK11. FIG. 15 illustrates a graphical plot of force vs. angular velocity based on the crankshaft testing model for sensors EK4-EK8. As illustrated, the forces modeled at the second harmonic mode (spatially) and the fifth harmonic mode (harmonically at about 1800 rad/sec) have been attenuated within operational force limits. Accordingly, any portion of the crankshaft 100 may be selectively modified with fixed counterweights (e.g., counterweights 120') and/or pendular counterweights (e.g., counterweights 120) and may be tuned in space and frequency to attenuate specific forces at particular harmonic modes. Various crankshafts and other rotating members may make use of the disclosed methods and systems. Any harmonic mode may be used to tune the member in space and frequency.

Other aspects and advantages of the subject disclosure can be obtained from a study of the drawings, the disclosure and the appended claims. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A crankshaft comprising:
a plurality of main journals axially-aligned along a longitudinal axis;
a plurality of crankpin journals radially-offset from the longitudinal axis, each of the crankpin journals configured to couple to a connecting rod;
a first web coupled to a first main journal of the plurality of main journals and a first crankpin journal of the plurality of crankpin journals, wherein the first crankpin journal is coupled adjacent a first end of the first web; and
a first counterweight coupled adjacent a second end of the first web, wherein the first counterweight is coupled to the second end of the first web using a pair of spaced apart pins configured to extend through apertures formed in the first counterweight and the second end of the first web, wherein a configuration of the first counterweight relative to the second end of the first web and the plurality of crankpin journals is spatially tuned and harmonically tuned to at least one harmonic mode of the crankshaft according to a geometric relationship as follows:

$$r/L = n^2$$

where r is a radius of rotation of the pair of spaced apart pins relative to the longitudinal axis, L is a difference between an aperture diameter of the apertures formed in the counterweight and the second end of the first web and a pin diameter of the pair of spaced apart pins, and n is an engine excitation order of the at least one harmonic mode to which the configuration is spatially tuned and harmonically tuned.

2. The crankshaft of claim 1, wherein the first counterweight is coupled to the second end of the first web as a bifilar pendulum.

3. The crankshaft of claim 1, wherein the first counterweight comprises a generally semi-annular disc shape including a slot configured to receive at least a portion of the first web.

4. The crankshaft of claim 1, wherein the first web is located within a displacement region of the at least one harmonic mode of the crankshaft, and wherein the first counterweight is slideably coupled to the first web to effect spatial tuning of the configuration of the first counterweight to the at least one harmonic mode of the crankshaft.

5. The crankshaft of claim 1, wherein the first counterweight is slideably coupled to the first web, and wherein a displacement of the first counterweight relative to the first web during operation of the crankshaft is configured to effect harmonic tuning of the configuration of the first counterweight to the at least one harmonic mode of the crankshaft.

6. The crankshaft of claim 1, further comprising:
   a second web coupled to a second main journal of the plurality of main journals and a second crankpin journal of the plurality of crankpin journals, wherein the second crankpin journal is coupled adjacent a first end of the second web; and
   a second counterweight coupled adjacent a second end of the second web, wherein a configuration of the first counterweight and the second counterweight relative to at least one of the second end of the second web, the plurality of crankpin journals, and the first counterweight is spatially tuned and harmonically tuned to the at least one harmonic mode of the crankshaft according to the geometric relationship of claim 1.

7. A method of balancing a crankshaft comprising a plurality of main journals axially-aligned along a longitudinal axis and a plurality of crankpin journals radially-offset from the longitudinal axis, wherein a plurality of webs are configured to couple at least a portion of the main journals with at least a portion of the crankpin journals, and wherein each of the crankpin journals are configured to couple to a connecting rod, the method comprising:
   determining at least one harmonic mode of the crankshaft;
   selecting a web of the plurality of webs based upon the determined at least one harmonic mode, wherein the selected web is coupled to at least one main journal of the plurality of main journals and at least one crankpin journal of the plurality of crankpin journals; and
   coupling a counterweight to the selected web, wherein the counterweight is coupled to the selected web using a pair of spaced apart pins configured to extend through apertures formed in the counterweight and the selected web, and wherein a configuration of the counterweight relative to an end of the first web to which the counterweight is coupled and the plurality of crankpin journals is spatially tuned and harmonically tuned to the at least one harmonic mode of the crankshaft according to a geometric relationship as follows:

$$r/L = n^2$$

where r is a radius of rotation of the pair of spaced apart pins relative to the longitudinal axis, L is a difference between an aperture diameter of the apertures formed in the counterweight and the selected web and a pin diameter of the pair of spaced apart pins, and n is an engine excitation order of the at least one harmonic mode to which the configuration is spatially tuned and harmonically tuned.

8. The method of claim 7, wherein the counterweight is coupled to the selected web as a bifilar pendulum.

9. The method of claim 7, wherein the counterweight comprises a generally semi-annular disc shape including a slot configured to receive at least a portion of the selected web.

10. The method of claim 7, wherein the selected web comprises an indented portion and the counterweight is coupled to at least the indented portion.

11. The method of claim 7, wherein selecting the web of the plurality of webs based upon the determined at least one harmonic mode comprises selecting a web within a displacement region of the determined at least one harmonic mode.

12. The method of claim 7, wherein the counterweight is slideably coupled to the selected web, and wherein a displacement of the counterweight relative to the selected web during operation of the crankshaft is configured to effect harmonic balancing of the crankshaft at or near the determined at least one harmonic mode of the crankshaft.

13. A counterweight for balancing a crankshaft comprising a plurality of main journals axially-aligned along a longitudinal axis, a plurality of crankpin journals radially-offset from the longitudinal axis, and a plurality of webs coupling the plurality of main journals with the plurality of crankpin journals, the counterweight comprising:
   a main body having a generally semi-annular disc shape;
   a slot formed in a portion of the main body, the slot configured to receive at least a portion of one of the plurality of webs to be coupled to the main body, wherein the slot is interposed between a first coupling wall and a second coupling wall formed in the main body;
   a first pair of apertures formed in the first coupling wall;
   a second pair of apertures formed in the second coupling wall, the second pair of apertures aligned with the first pair of apertures; and
   a coupling mechanism configured to extend through at least one aperture of the first pair of apertures, at least one aperture of the second pair of apertures and at least one aperture of a pair of web apertures of the one of the plurality of webs to secure the at least a portion of the one of the plurality of webs in the slot of the main body, wherein a configuration of the counterweight relative to the at least a portion of the one of the webs to which the counterweight is coupled and the plurality of crankpin journals is spatially tuned and harmonically tuned to at least one harmonic mode of the crankshaft according to a geometric relationship as follows:

$$r/L = n^2$$

where r is a radius of rotation of the coupling mechanism relative to the longitudinal axis, L is a difference between an aperture diameter of the first pair of apertures, the second pair of apertures and the pair of web apertures and a coupling mechanism diameter of the coupling mechanism, and n is an engine excitation order of the at least one harmonic mode to which the configuration is spatially tuned and harmonically tuned.

14. The counterweight of claim 13, wherein the first pair of apertures, the second pair of apertures, and the coupling mechanism are configured to couple the main body to the one of the plurality of webs as a bifilar pendulum.

15. The counterweight of claim 13, wherein the coupling mechanism comprises a pin.

16. The counterweight of claim 15, wherein the pin comprises a cylindrical main body and a flange disposed adjacent an end of the main body.

17. The counterweight of claim 16, wherein the difference between an aperture diameter and the coupling mechanism diameter is between 4 mm and 7 mm.

* * * * *